Jan. 14, 1930.  W. H. BAKER  1,743,751
TRACTIVE POWER UNIT
Filed Dec. 26, 1925

INVENTOR
W. H. Baker
BY Earl M. Sinclair
ATTORNEY

Patented Jan. 14, 1930

1,743,751

UNITED STATES PATENT OFFICE

WILLIAM HENRY BAKER, OF DES MOINES, IOWA

TRACTIVE POWER UNIT

Application filed December 26, 1925. Serial No. 77,891.

The principal object of this invention is to provide an improved electrically driven traction wheel and means for transmitting power from an electric motor to said wheel.

A further object is to provide improved means for applying a prime mover directly to the traction wheel in such a manner that a high degree of efficiency is obtained.

A further object is to transmit power from the electric motor to the traction wheel without the use of bevel gears.

A further object is to secure the electric motor to the traction wheel in such a manner that a high road clearance is obtained.

A further object is to combine the traction wheel and electric motor in one unit.

A further object is to provide a housing for the electric motor that is easily accessible for repairing the motor.

A further object is that by this motor unit construction various different gear ratios may be constructed in a thoroughly practical form.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Figure 1:
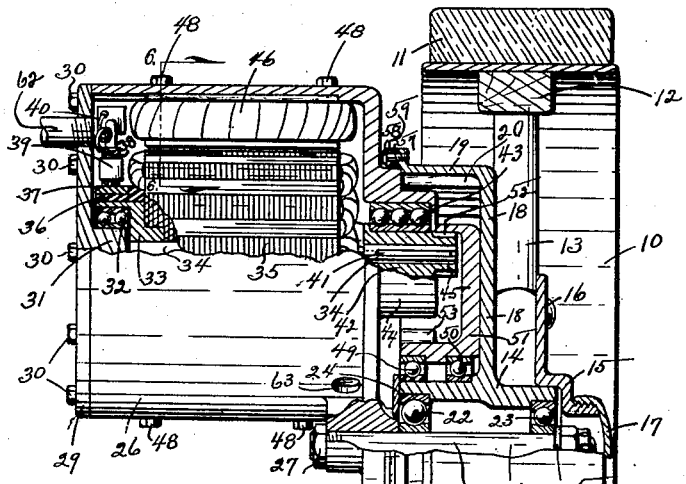
Fig. 1 is a sectional rear end view of my device ready for use.
Figure 6:
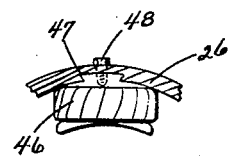
Fig. 6 is a sectional view of the means employed to secure the field coils in the motor housing and is taken on line 6—6 of Fig. 1.

The electric driven vehicles now on the market soon wear out, due to the use of bevel gears. As soon as the wheel or any part of the mechanism gets a little play the bevel gear ceases to be an efficient means of transmitting power. Another disadvantage of the electric driven vehicles on the market is their low road clearance. I have overcome these disadvantages by the use of spur gears throughout and the mounting of the motor above the axle of the wheel.

The wheel of my device consists of the rim 10 having the tire 11, which is made of rubber or the like. Inside this rim 10 is the felloe 12 carrying the radially extending spokes 13. These spokes are secured to the hub 14 and the outer hub plate 15 by the bolts 16. The numeral 17 designates a hub cap screwed onto the hub plate. Integrally formed on the hub 14 and extending outwardly therefrom is the disc 18 having the laterally extending peripheral flange 19. On the inner side of this flange 19 are inwardly extending gear teeth 20, the purpose of which will hereafter be explained. The hub 14 is rotatably mounted on the axle 21 with the ball bearings and cages 22 and 23 between the hub and axle. They are held in place by the outer ring of each of the cages engaging an internal shoulder in the hub 14 and by the retaining washers 24 and 25. The axle 21 extends through a portion of the motor housing 26 and is secured thereto by the nut 27. This motor housing extends downwardly and forms a gear plate housing, which I have designated by the numeral 28. The motor housing has the cover plate 29 held thereon by the cap screws 30. Near the center of this plate is the projection 31 extending inwardly and forming a journal on which the ball bearings and cage 32 rotate. Embracing the ball bearings and cage 32 is the bearing member 33 carrying one end of the armature shaft 34 on which is mounted the armature 35. Around the bearing member 33 and permanently secured thereto is the commutator having the insulation 36 and the contact points 37. Engaging this commutator is the ordinary carbon brush 38 mounted in the holder 39 and yieldingly held adjacent to the face of the commutator by the spring 40. The other end of the armature shaft 34 has mounted thereon and secured by the key 41, the sleeve 42. The slot in which this key lies extends to the end of the armature shaft, so that if it is desired to remove the sleeve the same may be accomplished by merely sliding the sleeve over the end of the armature shaft. Around this sleeve are the ball bearings and cage 43 which fit in the bearing member 44 which is integrally formed on the side of the housing 26 adjacent the traction wheel. The sleeve 42 may be omitted if desired and the armature shaft fitted in the anti-friction bearing 43. The numeral 45 designates a pinion integrally formed on the end of the sleeve 42 or on the armature shaft and extending beyond the bearing member 44 and ball bearings and cage 43. The field coils 46 are held in their proper place in the motor housing by having one of their sides formed into a dove tail tenon designed to slide into the grove 47 in the motor housing and then held in that position by the screws 48. By the above described arrangement of the motor in the housing the same may easily be taken apart for cleaning and repairs. Merely remove the cover plate 29 and the whole or any part of the motor or bearings can be obtained at once.

Figure 2:
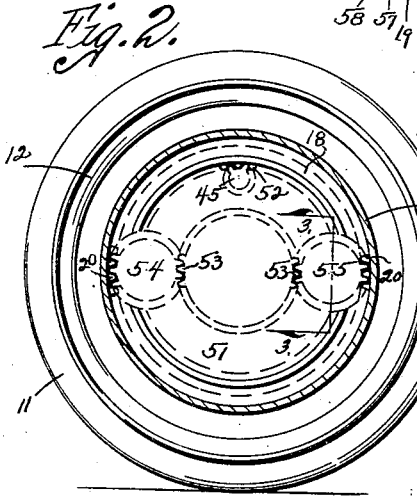
Fig. 2 is a side sectional view of my wheel and shows the gear ratio employed in Fig. 1. This ratio is adapted to medium sized trucks, tractors, or any other vehicle and any and all machines requiring tractive power.
Figure 3:
Fig. 3 is a view of one of the idler spur gears that drive the traction wheel and also shows the method employed to rotatably mount it on the gear plate housing. It is taken on line 3—3 of Fig. 2.

Around the hub 14 of the wheel and on the side adjacent the motor are the roller bearings and cages 49 and 50. Mounted on these roller bearings and cages is the wheel 51 having the gear teeth 52 on the inner side of its rim and in engagement with the pinion 45 on the armature shaft. On the hub of this wheel are also gear teeth 53 which are in engagement with the idler spur gears 54 and 55 each rotatably mounted on a stud 56 (Fig. 3) threaded into the gear plate housing 28. These idler gears are in engagement with the internal gear teeth 20. By this arrangement, which is shown in Figs. 1 and 2, the pinion 45 on the armature shaft will engage the teeth 52 on the inner side of the rim of the wheel 51. The gear teeth 53 on the hub of the wheel 51 will engage the spur gears 54 and 55 which will in turn engage the teeth 20.

On the rim of the flange 19 and adjacent the teeth 20 is a large washer or gasket 57 made of felt or the like. It is held in place by the cap screws 58 or bolts extending through a ring 59, through the felt washer and into the rim of the flange 19. This felt washer frictionally engages the motor housing and the gear plate housing and prevents dirt and foreign matter from entering the mechanism. It also prevents oil from escaping from the mechanism. So that this felt washer will have a tendency to work closer to the motor housing and gear plate housing rather than away from the same, the faces of the rim of the flange and ring 59 adjacent the felt washer extend inwardly and outwardly respectively on inclined lines as will be noted in the upper portion of Fig. 1. The wheel is held in place on the axle 21 by means of a nut 64 screwed on the outer end of said axle.

Figure 4:
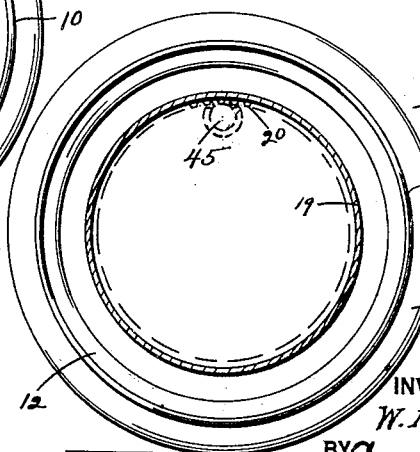
Fig. 4 is a view similar to Fig. 2, but shows a different gear ratio that may be used. It is designed for automobiles, busses, and any and all vehicles and machines requiring high tractive speed.

In cases where my device is desired for use on fast vehicles, the wheel 51 and the idler spur gears 54 and 55 are eliminated and the pinion 45 is in direct contact with the teeth 20. This arrangement is shown in Fig. 4.

Figure 5:
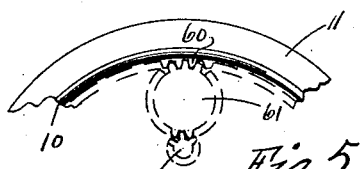
Fig. 5 is a detailed side view of still a different gear ratio. It is designed for very large trucks, tractors and any and all vehicles and machines requiring great tractive power.

In cases where my device is to be used for very heavy trucks, tractors, busses and the like, gear teeth 60 are formed on the inner side of the rim 10 and an idler spur gear 61 interposed between the pinion 45 and the teeth 60. This arrangement is shown in Fig. 5.

By the use of roller or ball bearings throughout, I have almost eliminated wear. All transmission of power is direct by the use of heat treated and hardened spur gears. This means that the teeth of the various gears are always in mesh.

The motor housing may be secured to the chassis of the vehicle in any desired manner. Because of its compactness, if it is desired, each of the four wheels of the vehicle may comprise and include one of my tractive power units.

My tractive power unit is adapted to vehicles carrying either storage batteries, or an internal combustion motor running a generator, or receiving energy from any other source. In either case the efficiency of my device will be understood by those skilled in the art.

It has been found best to employ a forced-draft ventilating system for the motor used in my device. The numeral 62 designates a pipe threaded into the cover plate of the motor housing 26 leading to a blower (not shown) which is in operative engagement with the power mechanism. By this arrangement the faster the electric motor rotates, the more screened air will enter the pipe 62. This air circulates around the motor and out the vent 63, keeping the motor and bearings cool.

It will be noted that the driving pinion 45 is located above and in the same vertical plane as the axis of the traction wheel. This arrangement is advantageous in several particulars, to wit: (1) It provides a high road clearance between the road and the motor housing. (2) Any looseness of the traction wheel or springing of the wheel itself cannot result in cramping or binding the mesh of the teeth of the driving pinion with respect to the driven member. (3) Several combinations of gearing may be installed selectively dependent upon the service required of the traction unit while still keeping the driving pinion of the prime mover directly over the axle of the traction wheel.

As the axle of the traction wheel projects through and is securely fixed to the housing plate 28 which in turn is rigid relative to the motor housing, there can be no misalignment between the traction wheel and prime mover.

Some changes may be made in construction and arrangement of my tractive power unit without departing from the real spirit and purpose of my invention and it is my intention to cover by my claims any modified forms of structure or use of mechanical equivalents which may be reasonably included within their scope.

I claim:

1. In a device of the class described, a motor housing, an electric motor in said housing and having an armature shaft, a gear housing integrally formed with and on said motor housing, an axle mounted on said gear housing and below said motor housing, a traction wheel rotatably mounted on said axle, an outwardly extending disc formed on the hub of said traction wheel, a laterally extending flange on said disc; said flange extending over said gear housing, a ring secured to the edge of said flange, a resilient washer between said ring and the edge of said flange designed to frictionally engage said motor housing and gear housing, and gear teeth on said flange in operative connection with said armature shaft.

2. In a device of the class described, a motor housing, an electric motor in said housing and having an armature shaft, a gear housing integrally formed with and on said motor housing, an axle mounted on said gear housing and below said motor housing, a traction wheel rotatably mounted on said axle, an outwardly extending disc formed on the hub of said traction wheel, a laterally extending flange on said disc, said flange extending over said gear housing, a ring secured to the edge of said flange, a resilient washer between said ring and the edge of said flange designed to frictionally engage said motor housing and gear housing; the faces of said ring and edge of said flange adjacent each other extending inwardly and outwardly, gear teeth on said flange, and spur gear driving connections between said armature shaft and said gear teeth.

3. In a device of the class described, a motor housing, an electric motor in said housing and having an armature shaft, a gear housing integrally formed with and on said motor housing, an axle mounted on said gear housing and arranged below said motor housing, a traction wheel rotatably mounted on said axle, an outwardly extending disc formed on the hub of said traction wheel, a laterally extending flange on said disc extending toward said gear housing, a resilient washer mounted in engagement with said flange, a ring engaging said washer, and means for causing said ring to be drawn toward said washer and for compressing said washer against said flange.

4. In a device of the class described, a motor housing, an electric motor in said housing and having an armature shaft, a gear housing integrally formed with and on said motor housing, an axle mounted on said gear housing and arranged below said motor housing, a traction wheel rotatably mounted on said axle, an outwardly extending disc formed on the hub of said traction wheel, a laterally extending flange on said disc extending toward said gear housing, a resilient washer mounted in engagement with said flange, a ring engaging said washer, said ring having its face beveled adjacent said washer and means for drawing said ring toward said washer whereby the washer is compressed against the face of said flange.

5. A tractive power unit comprising a vehicle wheel, a motor housing located above the axis of said wheel, a motor in said housing, gear connections between said motor and said wheel for rotating the latter, and a housing plate carried by said motor housing and projecting laterally therefrom and arranged to partially cover one face of said wheel to inclose said gear connections.

6. The combination with a vehicle wheel, of an electric motor, a housing therefor, a housing drum carried by said wheel, gear connections between said motor and said wheel and located within said drum, and a housing plate carried by said motor housing and arranged to substantially cover the face of said drum to inclose the gear connections.

7. The combination with a vehicle wheel having an axle and a hub rotatably mounted thereon, of a housing drum carried by and concentrically of said drum, a motor housing, an electric motor in said motor housing, gear connections between said motor and the hub of said wheel and located within said housing drum, and a housing plate carried by said motor housing and arranged to substantially cover the face of said drum to inclose said gear connections, said motor housing being located entirely above the plane of said axle.

8. The combination with a vehicle wheel having an axle and a hub rotatably mounted thereon, of a housing drum secured to and concentrically of said hub, a motor housing, a motor in said housing, gear connections between said motor and the wheel and located within said housing drum, and a housing plate integrally formed on said motor housing and having a laterally projecting flange overlapping the flange of said drum and cooperating with said drum to inclose said gear connections and also serving to provide a connecting means between said motor housing and the wheel.

9. The combination with a vehicle wheel having an axle and a hub rotatably mounted thereon, of a housing drum secured to and concentrically of said hub, a motor housing, a motor in said housing, gear connections between said motor and the wheel and located within said housing drum, a housing plate integrally formed on said motor housing and having a laterally projecting flange overlapping the flange of said drum and cooperating with said drum to inclose said gear connections and also serving to provide a connecting means between said motor housing and the wheel, and a compressible washer serving to close the joint between said housing drum and the flange of said housing plate.

10. The combination with a traction wheel having an axle and a hub rotatably mounted thereon, of a housing drum secured to and concentrically of said hub, a motor housing, a motor in said housing, gear connections between said motor and the wheel and located within said housing drum, and a housing plate rigidly carried by said motor housing and through which said axle extends, said housing plate having a laterally projecting flange overlapping the flange of said drum and cooperating with the drum to inclose said gear connections.

11. The combination with a traction wheel having an axle and a hub rotatably mounted thereon, of a housing drum secured to and concentrically of said hub, a motor housing, a motor in said housing having an armature shaft, a driving pinion fixed to said armature shaft, an internal gear carried by said housing drum for operative connection with said driving pinion, a housing plate rigidly carried by said motor housing and through which said axle extends, said housing plate cooperating with said drum to inclose said gear driving connections, said motor housing being located above the axis of said traction wheel and said driving pinion being located in the same vertical plane as the axis of said driving wheel.

WM. HENRY BAKER.